United States Patent [19]

Tanaka et al.

[11] 4,451,629
[45] May 29, 1984

[54] CONTACT LENS AND PROCESS FOR PREPARING THE SAME

[75] Inventors: Kyoichi Tanaka, Nagoya; Shinji Kanome, Kuwana; Tatsutoshi Nakajima, Nagoya; Kazuhiko Nakada, Nagoya; Nobuyuki Toyoshima, Nagoya, all of Japan

[73] Assignee: Toyo Contact Lens Co., Ltd., Nagoya, Japan

[21] Appl. No.: 337,170

[22] Filed: Jan. 5, 1982

[30] Foreign Application Priority Data

Jan. 12, 1981 [JP] Japan .................................. 56-3681
Oct. 15, 1981 [JP] Japan .............................. 56-165224

[51] Int. Cl.$^3$ .......................... C08F 16/38; G02C 7/04
[52] U.S. Cl. ............................ 526/238.23; 526/238.2; 527/313; 523/106; 523/108; 264/1.1; 264/2.6; 351/160 R; 351/160 H
[58] Field of Search ..................... 526/238.23, 238.2; 527/313; 523/106, 108; 264/1.1, 2.6; 351/160 R, 160 H

[56] References Cited

U.S. PATENT DOCUMENTS 3,103,508  9/1963  Fisher et al. .................. 526/238.23
4,042,538  8/1977  Lucas ............................ 526/238.23
4,365,050  12/1982  Ivani .................................. 523/108

Primary Examiner—John Kight, III
Assistant Examiner—Nathan M. Nutter
Attorney, Agent, or Firm—Armstrong, Nikaido, Marmelstein & Kubovcik

[57] ABSTRACT

A water-absorptive contact lens made of a copolymer comprising units of an ester of acrylic or methacrylic acid and at least one saccharide selected from D-galactose, D-glucose and D-mannose and units of at least one member selected from a hydrophilic monomer and a hydrophobic monomer, which has excellent oxygen permeability and affinity for the eye and can be worn continuously for a long period of time. The contact lens is prepared by polymerizing a monomer mixture containing an ester of acrylic or methacrylic acid with a ketalized saccharide and a hydrophilic monomer and-/or a hydrophobic monomer, and after forming the resulting copolymer into a contact lens, if necessary, treating the copolymer having a shape of contact lens with an acid to convert the ketal groups into hydroxyl groups.

6 Claims, 1 Drawing Figure

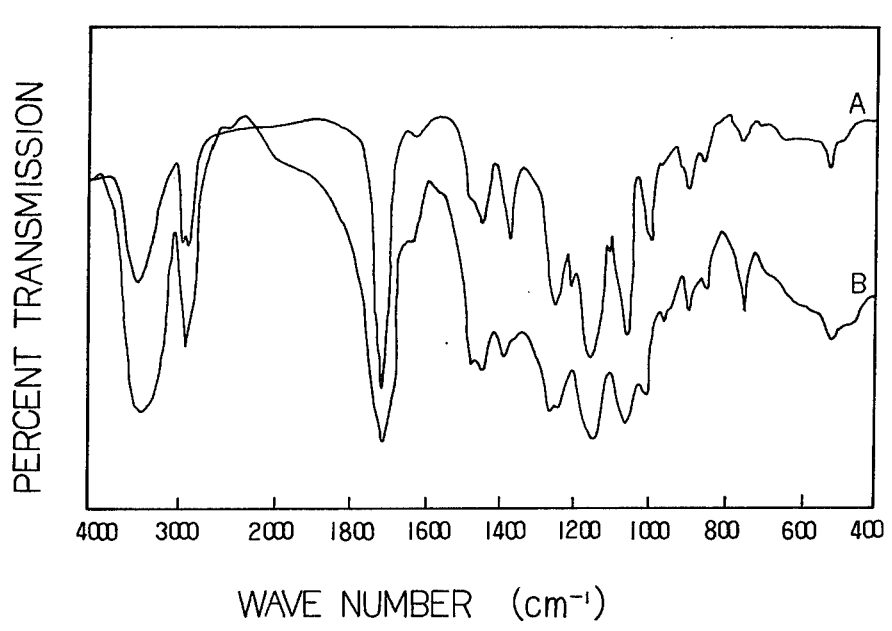

CONTACT LENS AND PROCESS FOR PREPARING THE SAME

BACKGROUND OF THE INVENTION

The present invention relates to a novel water-absorption contact lens and a process for the preparation thereof. More particularly, the invention relates to a contact lens made of a copolymer containing methacrylate or acrylate units having saccharides as side chains.

Various water-absorptive contact lenses have hitherto been known, and among them, a contact lens having a water content of 30 to 40% by weight made of a polymer comprising predominantly 2-hydroxyethyl methacrylate is the most popular. However, this water-absorptive contact lens made of the 2-hydroxyethyl methacrylate polymer has no sufficient permeability to oxygen of an amount required physiologically in the cornea of the eye. Therefore, it is impossible to wear the lenses over about 16 hours a day, and the wearing over this limit is dangerous because of causing disturbance of the corneal tissue.

For this reason, attempts have been made to develop contact lenses having a high water content with the object of increasing the water content, thereby supplying a physiologically sufficient amount of oxygen for the cornea from the atmosphere to the cornea through a large amount of water contained in the contact lens material. The most general material for such high water content contact lenses is copolymers of a major amount of N-vinyl pyrrolidone and a minor amount of a methacrylate compound, e.g. 2-hydroxyethyl methacrylate and alkyl methacrylates such as methyl methacrylate. These copolymers have an ability to absorb water usually in an amount of about 50 to about 80% by weight. Many of these high water content contact lenses are able to supply a sufficient amount of oxygen from the atmosphere to the cornea through the lens material. However, they have the defects that due to high water content, the strength of the lens materials is low and the lens contour is unstable, and therefore are not sufficiently popularized. Also, wear of high water content contact lenses made of such a vinyl pyrrolidone polymer tends to cause keratitis diffusa superficials frequently, and this fact is also one of major causes of hindering the popularization of the high water content contact lenses. Like this, the oxygen permeability of a contact lens material is a necessary condition in providing a water-absorptive contact lens which can be continuously worn for a long period of time, but not a sufficient condition.

It is known that in addition to the oxygen permeability of a lens material, the affinity of the lens material for the eye tissue, especially the corneal tissue, is a large factor for providing a water-absorptive contact lens which can be worn continuously on the eye for a long period of time. However, there is no standardized method of confirming the affinity of a lens material for the eye tissue, and this makes it more difficult to develop a better contact lens of water-absorptive type.

Accordingly, it is an object of the present invention to provide a water-absorptive contact lens which has a sufficient water content for supplying oxygen to the cornea of the eye and moreover has an excellent affinity for the eye tissue.

A further object of the invention is to provide a water-absorptive contact lens which can be worn continuously for a long period of time.

Another object of the invention is to provide a process for preparing a water-absorptive contact lens.

These and other objects of the present invention will become apparent from the description hereinafter.

SUMMARY OF THE INVENTION

The present inventors have made a study of saccharides which have an affinity for the living body, but have never been utilized as a component for constituting a water-absorptive contact lens, and have now found that a material which is prepared by reacting four hydroxyl groups amoung five hydroxyl groups of at least one monosaccharide selected from D-galactose, D-glucose and D-mannose with a ketone to ketalize the monosaccharide, introducing a polymerizable group to the residual one hydroxyl group, copolymerizing the resulting compound with other copolymerizable compounds such as hydrophilic and hydrophobic monomers and treating the resulting copolymer with an acid to convert the ketal groups into hydroxyl groups again, can provide a contact lens having excellent characteristics.

In accordance with the present invention, there is provided a water-absorptive contact lens made of a copolymer comprising acrylate or methacrylate units having saccharides as side chains and units of at least one member selected from the group consisting of a hydrophilic monomer and a hydrophobic monomer.

BRIEF DESCRIPTION OF THE DRAWING

The accompanying drawing is infrared absorption spectrums of a copolymer before and after an acid treatment which is used as a contact lens material in the present invention.

DETAILED DESCRIPTION

An acrylic or methacrylic ester with a ketalized saccharide [hereinafter referred to as "ketalized saccharide (meth)acrylate"] which is used for preparing the water-absorptive contact lens of the present invention is obtained by ketalizing D-galactose, D-glucose or D-mannose with a ketone compound such as acetone, methyl ethyl ketone, cyclohexanone, acetophenone or methyl isobutyl ketone, and then reacting the thus ketalized saccharide with an acryloyl or methacryloyl halide to introduce the polymerizable group into the residual one hydroxyl group. Although a general process for preparing the ketalized saccharide (meth)acrylates is explained below the reference to the case using D-galactose as a saccharide, acetone as a ketone compound and methacryloyl chloride as an acid halide, the same things may be said of D-glucose and D-mannose.

The ketalization of D-galactose can be conducted, for instance, by reacting D-galactose with a ketone, e.g. acetone, in the presence of a catalyst such as zinc chloride, sulfuric acid, ferric chloride, phosphoric acid or copper sulfate, as shown in the following reaction scheme:

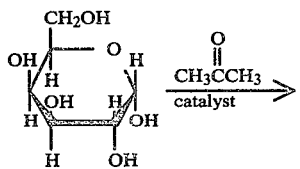

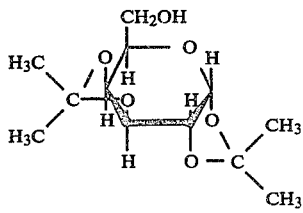

By the ketalization, the hydroxyl groups at the 1 and 2 positions and the hydroxyl groups at the 3 and 4 positions of D-galactose are replaced with isopropylidene groups to produce 1,2:3,4-di-O-isopropylidene-D-galactopyranose.

A polymerizable group is then introduced at the 6 position by reacting a ketalized saccharide with an acryloyl or methacryloyl halide, as shown in the following reaction scheme in which 1,2:3,4-di-O-isopropylidene-D-galactopyranose is reacted with methacryloyl chloride to produce 1,2:3,4-di-O-isopropylidene-6-O-methacryloyl-D-galactopyranoside (another name: 1,2:3,4-di-O-isopropylidene-6-O-methacryloyl-D-galactose)(hereinafter referred to as "6-MDIGa") which is polymerizable compound.

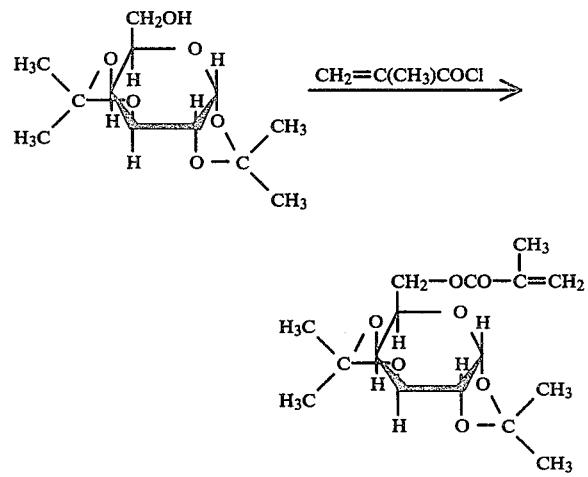

The above esterification is conducted preferably in the presence of triethylamine or pyridine to remove the byproduced hydrochloric acid.

In case that the starting material is D-glucose, there is obtained 1,2:5,6-di-O-isopropylidene-3-O-methacryloyl-D-glucofuranoside (another name: 1,2:5,6-di-O-isopropylidene-3-O-methacryloyl-D-glucose) (hereinafter referred to as "3-MDIGLu"). In case that the starting material is D-mannose, there is obtained 1-O-methacryloyl-2,3:5,6-di-O-isopropylidene-D-mannofuranoside (another name: 1-O-methacryloyl-2,3:5,6-di-O-isopropylidene-D-mannose)(hereinafter referred to as "1-MDIMa"). 6-MDIGa and 1-MDIMa are produced in the form of white powders having melting points of 62° to 63.5° C. and 105° to 106.5° C., respectively, and 3-MDIGLu is produced in the form of a liquid having a boiling point of 113° C., under a pressure of 0.12 mmHg. In the same manner as the above, various ketalized saccharide (meth)acrylates can be prepared from D-galactose, D-glucose and D-mannose by employing various acryloyl and methacryloyl halides and ketone compounds. The ketalized saccharide (meth)acrylate monomers may be employed alone or in admixture thereof.

The thus obtained ketalized saccharide (meth)acrylates are copolymerized with various monomers. The material for the water-absorptive contact lens of the present invention is prepared by copolymerizing the ketalized saccharide (meth)acrylates with at least one member selected from a hydrophilic monomer and a hydrophobic monomer.

Preferable examples of the hydrophilic monomer used in the present invention are, for instance, 2-hydroxyethyl methacrylate, 2-hydroxyethyl acrylate, 2-hydroxypropyl methacrylate, 2-hydroxypropyl acrylate, polyethylene glycol monomethacrylate, polyethylene glycol monoacrylate, acrylamide, methacrylamide, dimethylacrylamide, dimethylmethacrylamide, acrylic acid, methacrylic acid, N-vinyl pyrrolidone, and the like. These hydrophilic monomers may be employed alone or in admixture thereof.

Upon the deketalization to convert the ketal groups into hydroxyl groups by immersing a contact lens formed from the obtained copolymer in an aqueous solution of an acid, the copolymerization of the ketalized saccharide (meth)acrylates with these hydrophilic monomers facilitates uniform and effective permeation of the acid solution into the lens material, thus causing the deketalization efficiently. Also, in case of water of the homopolymer thereof is relatively low, e.g. 2-hydroxyethyl methacrylate and 2-hydroxypropyl methacrylate, it is possible to control the water content of the obtained contact lens to some extent by copolymerizing the ketalized saccharide (meth)acrylate with such hydrophilic monomers.

Preferable examples of the hydrophobic monomer used in the present invention are, for instance, alkyl esters of acrylic or methacrylic acid in which an alkyl group has 1 to 15 carbon atoms, e.g. methyl methacrylate, methyl acrylate, ethyl methacrylate, ethyl acrylate, butyl methacrylate, butyl acrylate, amyl methacrylate, amyl acrylate, cyclohexyl methacrylate, cyclohexyl acrylate, octyl methacrylate, octyl acrylate, decyl methacrylate, decyl acrylate, undecyl methacrylate, undecyl acrylate, lauryl methacrylate and lauryl acrylate, styrene, vinyl acetate, vinyl propionate, acrylonitrile, and the like. These hydrophobic monomers may be employed alone or in admixture thereof. The use of the hydrophobic monomers is effective particularly for increasing the strength of the obtained water-absorptive contact lens and thus improving the durability of the lens as well as controlling the water content of the lens.

The amount of the ketalized saccharide (meth)acrylate monomer is selected from 5 to 97 parts by weight, preferably 20 to 80 parts by weight, more preferably 40 to 70 parts by weight, per 100 parts by weight of the total amount of the ketalized saccharide (meth)acrylate and the hydrophilic monomer and/or the hydrophobic monomer. The ketalized saccharide (meth)acrylate is copolymerized with at least one of a hydrophilic monomer and a hydrophobic monomer. In case of employing the hydrophilic monomer, the amount thereof is selected from 3 to 95 parts by weight, preferably 20 to 85 parts by weight, more preferably 30 to 60 parts by weight, per 100 parts by weight of the total amount of the ketalized saccharide (meth)acrylate and the hydrophilic monomer and/or the hydrophobic monomer. In case of employing the hydrophobic monomer, the amount thereof is selected from 1 to 40 parts by weight, preferably 3 to 20 parts by weight, more preferably 5 to 12 parts by weight, per 100 parts by weight of the total amount of the ketalized saccharide (meth)acrylate and the hydrophobic monomer and/or the hydrophilic monomer. When the amount of the ketalized saccharide (meth)acrylate monomer is more than 97 parts by weight, the strength of the obtained contact lens is decreased, and when the amount is less than 5 parts by weight, the effects to be produced by its use become poor. Also, when the amount of the hydrophilic monomer is more than 95 parts by weight, the effects to be produced by the use of the ketalized saccharide (meth)acrylate become poor, and when the amount of the hydrophobic monomer is more than 40 parts by weight, the deketalization by acid treatment is hard to smoothly proceed.

The above-mentioned ketalized saccharide (meth)acrylate monomer and at least one of the hydrophilic and hydrophobic monomers are selected and admixed so that the mixture thereof contains the monomers in amounts within the above-mentioned respective ranges and the total amount of the monomers selected from the above three kinds of the monomers becomes 100 parts by weight. Some ketalized saccharide (meth)acrylate monomers have a certain limit in compatibility with the hydrophilic monomers. For instance, 6-MDIGa and 1-MDIMa have a limit in the compatibility, and 6-MDIGa should be employed in an amount of not more than about 70 parts by weight and 1-MDIMa should be employed in an amount of not more than about 25 parts by weight, respectively, per 100 parts by weight of the total amount of the 6-MDIGa or 1-MDIMa and the hydrophilic monomer. 3-MDIGLu is compatible with the hydrophilic monomers in all proportions.

A cross-linking agent having at least two polymerizable functional groups may be employed in the present invention for the purpose of improving the solvent resistance and shape stability of the obtained contact lens. Preferable examples of the cross-linking agent used in the present invention are, for instance, ethylene glycol dimethacrylate, ethylene glycol diacrylate, diethylene glycol dimethacrylate, diethylene glycol diacrylate, triethylene glycol dimethacrylate, triethylene glycol diacrylate, vinyl methacrylate, vinyl acrylate, allyl methacrylate, allyl acrylate, divinyl benzene, diallyl phthalate, trimethylolpropane trimethacrylate, and the like. These cross-linking agents may be employed alone or in admixture thereof. The amount of the cross-linking agent is selected from 0.01 to 2 parts by weight to 100 parts by weight of the mixture of the above-mentioned monomers.

The polymerization of the monomers is carried out by employing usual free radical polymerization initiators which are conventionally employed in the polymerization of unsaturated hydrocarbon compounds, e.g. benzoyl peroxide, azobisisobutyronitrile and azobisdimethylvaleronitrile. The polymerization initiators are employed alone or in admixture thereof, usually in an amount of about 0.05 to about 1 part by weight to 100 parts by weight of the mixture of the whole monomers used.

The polymerization may be carried out in the presence of a substance as a wetting agent which is soluble in water and is inert to the polymerization reaction, e.g. ethylene glycol, propylene glycol, butylene glycol, polyethylene glycol, polypropylene glycol and glycerin. The amount of the wetting agent is selected from about 2 to about 45% by weight based on the total amount of the whole monomers used and the wetting agent. The use of the wetting agent is not essential, but is very effective for the acid treatment of the copolymer for the deketalization, because the wetting agent is included in the obtained copolymer when the polymerization is carried out in the presence of the wetting agent by a bulk polymerization process. That is to say, even in cases where the hydrophilic monomer is employed in a small proportion or is not employed, an acid solution can be effectively permeated into the lens material through the wetting agent impregnated in the lens material in a step of treating the contact lens formed from the obtained copolymer with an acid, thus causing the deketalization efficiently. The employed wetting agent can be easily replaced with water or a physiological saline water, for instance, by subjecting the acid-treated contact lens to neutralization treatment in an aqueous solution of an alkaline substance and immersing the lens in water or a physiological saline water, and if desired, further conducting the boiling treatment of the lens. The use of the wetting agent in an amount of more than 45% by weight is not desirable, because of being easy to cause trouble such as lowering of the optical property of the lens due to occurrence of white turbidity in the acid-treated lens material.

The polymerization and the formation into a contact lens shape can be conducted by usual techniques. For instance, the polymerization may be conducted in a mold corresponding to a shape of contact lens so as to directly provide a copolymer shaped in contact lens. The thus obtained contact lens may be further mechanically finished, as occasion demands. Also, the polymerization may be conducted in a suitable mold or container to form a contact lens material in the form of block, sheet or rod, and the lens material may be then mechanically processed in a usual manner such as cutting and polishing to give contact lenses of a desired shape. The copolymer obtained as a lens material has approximately the same molar composition as that of the polymerizable compounds used.

The copolymer in the form of a contact lens is treated with various acids such as organic and inorganic acids to convert the ketal groups in the copolymer into hydroxyl groups. For instance, as shown in the following reaction scheme, isopropylidene groups are eliminated by hydrolysis so as to make the copolymer hydrophilic.

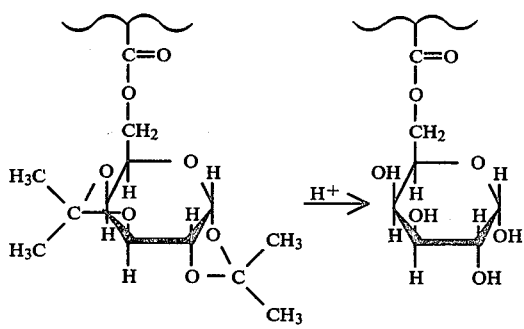

The thus-treated copolymer contains units of a methacryloyloxy- or acryloyloxy-monosaccharide, i.e. units of a methacrylic or acrylic acid ester with D-galactose, D-glucose or D-mannose.

Examples of the acid used in the above acid treatment are, for instance, hydrochloric acid, sulfuric acid, phosphoric acid, formic acid, acetic acid, trifluoroacetic acid, and the like. In case that the concentration of the acid used is high, there is the possibility of deterioration of the lens material and occurrence of crack. Therefore, it is desirable to conduct the acid treatment with raising gradually or stepwise the concentration of the aqueous treating liquor. Suitable acid concentration and immersion time vary depending on the material of the lens to be treated and the kind of the acid used, and cannot be absolutely defined. For instance, in case of hydrochloric acid, the treatment is usually made in a concentration of about 3 to about 20% by weight for about 3 to about 6 hours at room temperature. In case of formic acid or acetic acid, the treatment is usually made in a concentration of about 30 to about 90% by weight for about 2 hours to about 20 days at room temperature. In case of trifluoroacetic acid, the treatment is usually made in a concentration of about 80 to about 90% by weight for about 1 to about 2 hours at room temperature. In case that the material of the lens to be treated does not contain hydrophilic monomer units and moreover is not impregnated with a wetting agent, rapid causing of the deketalization reaction is easy to produce crack in contact lenses, and accordingly it is particularly desirable to conduct the acid treatment with increasing gradually or stepwise the concentration of acid in the treating liquor. In that case, the treatment may be carried out, for instance, by first immersing a contact lens in an aqueous acid solution of a low concentration, e.g. about 5% by weight, and then immersing it in an aqueous acid solution of a higher concentration.

The reaction caused by the above-mentioned acid treatment can be carried out with good reproducibility within a certain permitted limit without being strictly regulated by a standard treating method and a standard treating time, and accordingly the acid treatment as mentioned above is advantageously adoptable to an industrial practice.

The acid-treated contact lens may be further immersed in an aqueous solution of an alkaline substance such as sodium carbonate to neutralize the acid included in the lens. The acid-treated contact lens is usually immersed or boiled in water or a physiological saline water to remove the acid or wetting agent included in the lens.

The water-absorptive contact lens of the present invention can be continuously worn on the eye for a long period of time, since the lens has a high water content and accordingly has an excellent oxygen permeability, and moreover has an excellent affinity for the eye tissue in addition to softness and flexibility. Further, the contact lens of the invention is transparent and has an excellent optical property, and also can be boiled in water for sterilization without impairing excellent characteristics of the lens.

The present invention is more specifically described and explained by means of the following Examples, in which all % are by weight unless otherwise noted. These Examples are intended to illustrate the invention and are not to be understood to limit the scope of the invention. Also, it is to be understood that various changes and modifications may be made in the invention without departing from the spirit and scope thereof.

The following Reference Examples are also presented to illustrate the preparation of ketalized saccharide (meth)acrylates as used in the present invention.

REFERENCE EXAMPLE 1

[Synthesis of 6-MDIGa]

(1) Ketalization

To 225 ml. of acetone in an Erlenmeyer flask was added 21.6 g. of anhydrous zinc chloride, and was suspended with agitation. To the suspension was further added 0.72 ml. of concentrated sulfuric acid, and was vigorously agitated. To the suspension was quickly added 18 g. of anhydrous D-galactose powder and the flask was sealed to start the reaction. After continuing the agitation for 4 hours, a suspension of 36 g. of anhydrous sodium carbonate in 63 ml. of water was added dropwise to the reaction mixture as quickly as possible. The agitation was continued till zinc ion was liberated, and the reaction mixture was filtered with suction. The filtrate was then concentrated under reduced pressure till no acetone was flowed out, to give an oil layer. The oil layer was purified by extracting with an ether, and then desiccating, concentrating and distilling the extract under reduced pressure, to give 15.1 g. of 1,2:3,4-di-O-isopropylidene-D-galactopyranose (yield: 58.0%). The boiling point of the product was 131° to 135° C. under 0.2 mmHg.

(2) Introduction of methacryloyl group

In 200 ml. of an ether was dissolved 51 g. of 1,2:3,4-di-O-isopropylidene-D-galactopyranose, and thereto was added 20 g. of triethylamine as an agent for removing hydrochloric acid. While maintaining the mixture at a temperature of 0° to 5° C., with ice, 20.5 g. of methacryloyl chloride diluted with a small amount of an ether was added dropwise to the mixture to start the reaction. After continuing the agitation for 1 hour, the reaction mixture was filtered with suction to remove precipitate, and ether was distilled away under reduced pressure from the filtrate. A small amount of n-hexane was then added to the residue and a polymeric material produced at the time of the reaction was removed by filtration. From the filtrate, n-hexane was distilled away to give a sirupy liquid. The sirupy liquid was recrystallized from a water-ethanol mixed solvent (90:10 by volume) to give 26.8 g. of 6-MDIGa in the form of a white powder. The yield of the product was 40.9% and the melting point was 62° to 63.5° C.

REFERENCE EXAMPLE 2

[Synthesis of 3-MDIGLu]

(1) Ketalization

To 1,000 ml. of anhydrous acetone was added 150 g. of anhydrous D-glucose, and thereto was added with agitation a mixture of 120 g. of anhydrous zinc chloride and 7.5 g. of 85% phosphoric acid. The reaction was carried out at room temperature for 30 hours with agitation. The reaction mixture from which the undissolved D-glucose was removed, was made basic to neutralize the acid by adding a solution of 85 g. of sodium hydroxide dissolved in 85 ml. of water, and the inorganic salt was removed therefrom. The reaction mixture was concentrated under reduced pressure and extracted with chloroform, and chloroform was distilled away to give a solid. The solid was taken out and recrystallized from ligroin having a boiling point of 90° C. to give 73.8 g. of 1,2:5,6-di-O-isopropylidene-D-glucofranose (yield: 34.1% yield). The melting point of the product was 110° to 111° C.

(2) Introduction of methacryloyl group

The reaction was carried out in the same manner as in Reference Example 1 except that 1,2:5,6-di-O-isopropylidene-D-glucofranose and 500 ml. of acetone were employed instead of 1,2:3,4-di-O-isopropylidene-D-galactopyranose and 200 ml. of ether, respectively, to give a sirupy liquid. The sirupy liquid was subjected to distillation under reduced pressure to give 17.2 g. of 3-MDIGLu (yield: 26.2%). The boiling point of the product was 113° C. under 0.12 mmHg.

REFERENCE EXAMPLE 3

[Synthesis of 1-MDIMa]

(1) Ketalization

A mixture of 50 g. of D-mannose, 1,500 ml. of anhydrous acetone and 35 ml. of concentrated sulfuric acid was agitated. D-mannose was completely dissolved after 2 to 3 hours to give a light yellow solution. The reaction mixture was then neutralized with anhydrous sodium carbonate. After filtering the reaction mixture, small amounts of active carbon and anhydrous sodium carbonate were added to the filtrate, and it was refluxed for 1 hour and was again filtered. The filtrate was concentrated to give a solid. The solid was taken out and was recrystallized from petroleum ether to give 32.0 g. of 2,3:5,6-di-O-isopropylidene-D-mannofuranose (yield: 44.3%). The melting point of the product was 122° to 123° C.

(2) Introduction of methacryloyl group

The reaction was carried out in the same manner as in Reference Example 2 except that 2,3:5,6-di-O-isopropylidene-D-mannofranose was employed instead of 1,2:5,6-di-O-isopropylidene-D-glucofuranose, to give a solid. The solid was recrystallized from a water-methanol mixed solvent (75:25 by volume) to give 24.2 g. of 1-MDIMa (yield: 36.9%). The melting point of the product was 105° to 106.5° C.

EXAMPLE 1

There were mixed and dissolved 28.6 g. of 6-MDIGa obtained in Reference Example 1, 64.3 g. of 2-hydroxyethyl methacrylate (2-HEMA), 3.6 g. of lauryl methacrylate (LMA), 3.6 g. of methyl methacrylate (MMA) and 0.045 g. of α,α'-azobisdimethylvaleronitrile (ADMVN) as a polymerization initiator. The mixture was placed in a test tube. The thermal polymerization was carried out stepwise at 40° C. for 48 hours in a constant temperature water bath, and then at 50° C. for 16 hours, at 70° C. for 4 hours and at 90° C. for 4 hours in a hot air circulating dryer to give a polymer in the form of a rod. The obtained polymer was hard, colorless and transparent. The rod was cut and polished in a usual manner to form into contact lenses.

The lenses were immersed in a 50% aqueous solution of formic acid for 30 minutes and then in 6 N hydrochloric acid for 2 hours (or in a 50% aqueous solution of formic acid for 30 minutes and then in an about 11% aqueous solution of hydrochloric acid for 6 hours) to convert isopropylidene groups into hydroxyl groups. The lenses were then immersed in a 0.024% aqueous solution of sodium carbonate to conduct the neutralization treatment. The obtained water-absorptive contact lenses were soft and flexible, and had a water content of 47.6%, an oxygen permeability of $1.30 \times 10^{-10}$ ml.cm./cm.$^2$sec.mmHg, a refractive index ($n_D^{20}$) of 1.414 and a visible ray percent transmission of more than 90%.

The oxygen permeability was measured at 35° C. in a 0.9% aqueous solution of sodium chloride by a platinum electrode method employing a film-oxygen gas permeameter of Seikaken type made by Rikaseiki Kogyo Kabushiki Kaisha.

The visible ray percent transmission was measured at a wavelength region of 780 to 380 mm. by Double-Beam Spectro Photometer Type UV-210 made by Shimadzu Corporation by employing a polymer film which was interposed between quartz plates.

The refractive index was measured by employing Abee's refractometer made by Erma Optical Works Co., Ltd. and disk specimens.

EXAMPLES 2 TO 5

Water-absorptive contact lenses were prepared in the same manner as in Example 1 except that respective components used in copolymerization were employed in amounts shown in Table 1.

The results are shown in Table 1, in which AMA shows allyl methacrylate.

With respect to the 6-MDIGa copolymer obtained in Example 3, infrared absorption spectrums of the copolymer before acid treatment and the copolymer after acid treatment were measured by employing infrared spectrophotometer Type A-202 made by Japan Spectroscopic Co., Ltd. The results are shown in the accompanying drawing in which numerals A and B are for the copolymer before acid treatment and for the copolymer after acid treatment. A clear increase of hydroxyl group is observed in the 6-MDIGa copolymer treated with acid from the peak of hydroxyl group in the neighborhood of 3,400 cm$^{-1}$.

TABLE 1

| | Example 2 | Example 3 | Example 4 | Example 5 |
|---|---|---|---|---|
| Components (g.) | | | | |
| 6-MDIGa | 37.5 | 44.4 | 50 | 60 |
| 2-HEMA | 56.3 | 50 | 40 | 30 |

TABLE 1-continued

| | Example 2 | Example 3 | Example 4 | Example 5 |
|---|---|---|---|---|
| LMA | 3.1 | 2.8 | 9.5 | 9 |
| MMA | 3.1 | 2.8 | — | — |
| AMA | — | — | 0.5 | 1.0 |
| ADMVN | 0.045 | 0.045 | 0.045 | 0.045 |
| Physical property | | | | |
| Refractive index ($n_D^{20}$) | 1.402 | 1.394 | 1.402 | 1.391 |
| Water content (%) | 54.8 | 60.0 | 55.5 | 64.1 |
| Oxygen permeability (ml. cm./cm.$^2$ sec. mmHg) | $1.33 \times 10^{-10}$ | $1.58 \times 10^{-10}$ | $1.32 \times 10^{-10}$ | $1.61 \times 10^{-10}$ |
| Visible ray percent transmission (%) | >90 | >90 | >90 | >90 |

EXAMPLE 6

There were admixed and dissolved 50 g. of 3-MDI-GLu obtained in Reference Example 2, 25 g. of 2-hydroxyethyl methacrylate (2-HEMA), 25 g. of methyl methacrylate (MMA), 0.25 g. of ethylene glycol dimethacrylate (EDMA) and 0.1 g. of α,α'-azobisdimethylvaleronitrile (ADMVN) as a polymerization initiator, and the mixture was placed in a test tube. The thermal polymerization was carried out stepwise first at 40° C. for 24 hours in a constant temperature water bath and then at 50° C. for 8 hours, at 60° C. for 6 hours, at 80° C. for 6 hours, at 100° C. for 3 hours and at 110° C. for 3 hours to give a light yellow, transparent polymer in the form of a rod. The rod was cut and polished in a usual manner to form into contact lenses, and treated with an acid in the same manner as in Example 1 to give water-absorptive contact lenses. The lenses had a water content of 77.9%, an oxygen permeability of $4.10 \times 10^{-10}$ ml.cm./cm.$^2$sec.mmHg, a refractive index ($n_D^{20}$) of 1.366 and a visible ray percent transmission of more than 90%.

EXAMPLES 7 TO 9

Water-absorptive contact lenses were prepared in the same manner as in Example 6 except that the respective components used in the copolymerization were employed in amounts shown in Table 2.

The results are shown in Table 2.

TABLE 2

| | Example 7 | Example 8 | Example 9 |
|---|---|---|---|
| Components (g.) | | | |
| 3-MDIGLu | 25 | 75 | 25 |
| 2-HEMA | 50 | 25 | 75 |
| MMA | 25 | — | — |
| EDMA | — | 0.5 | 0.5 |
| ADMVN | 0.1 | 0.1 | 0.1 |
| Physical property | | | |
| Refractive index ($n_D^{20}$) | 1.406 | 1.348 | 1.380 |
| Water content (%) | 48.7 | 90.7 | 70.0 |
| Oxygen permeability (ml. cm./cm.$^2$ sec. mmHg) | $1.47 \times 10^{-10}$ | $4.55 \times 10^{-10}$ | $2.38 \times 10^{-10}$ |
| Visible ray percent transmission (%) | >90 | >90 | >90 |

EXAMPLE 10

There were admixed and dissolved 17 g. of 1-MDIMa obtained in Reference Example 3, 78 g. of 2-hydroxyethyl methacrylate (2-HEMA), 5 g. of lauryl methacrylate (LMA) and 0.07 g. of α,α'-azobisisobutyronitrile (AIBN) as a polymerization initiator, and the mixture was placed in a test tube. The thermal polymerization was carried out first at 35° C. for 48 hours in a constant temperature water bath and then carried out in a hot air circulating dryer at 50° C. for 16 hours, at 70° C. for 4 hours and at 90° C. for 4 hours, to give a colorless, transparent polymer in the form of a rod. The rod was cut and polished in a usual manner to form into contact lenses. The lenses were treated with an acid in the same manner as in Example 1 to give water-absorptive contact lenses. The thus obtained lenses had a water content of 45.5%, an oxygen permeability of $1.62 \times 10^{-10}$ ml.cm./cm.$^2$sec.mmHg, a refractive index ($n_D^{20}$) of 1.412 and a visible ray percent transmission of more than 90%.

EXAMPLES 11 AND 12

Water-absorptive contact lenses were prepared in the same manner as in Example 10 except that respective components in the polymerization were employed in amounts shown in Table 3.

The results are shown in Table 3, in which AMA shows allyl methacrylate.

TABLE 3

| | Example 11 | Example 12 |
|---|---|---|
| Components (g.) | | |
| 1-MDIMa | 7 | 20 |
| 2-HEMA | 77 | 75 |
| LMA | 5 | 4.5 |
| AMA | 1 | 0.5 |
| AIBN | 0.07 | 0.07 |
| Physical property | | |
| Refractive index ($n_D^{20}$) | 1.416 | 1.417 |
| Water content (%) | 44 | 42.9 |
| Oxygen permeability (ml. cm./cm.$^2$ sec. mmHg) | $1.42 \times 10^{-10}$ | $1.66 \times 10^{-10}$ |
| Visible ray percent transmission (%) | >90 | >90 |

EXAMPLE 13

In a monomer mixture of 55.6 g. of 3-MDIGLu obtained in Reference Example 2, 27.8 g. of methyl methacrylate (MMA), 12.4 g. of 2-hydroxyethyl methacrylate (2-HEMA) and 0.2 g. of allyl methacrylate (AMA) were dissolved 4.2 g. of ethylene glycol (EG) as a wetting agent and 0.04 g. of azobisdimethylvaleronitrile (ADMVN) as a polymerization initiator. The mixture was placed in a test tube, and the polymerization was carried out stepwise at 35° C. for 48 hours, at 50° C. for 4 hours and at 60° C. for 8 hours to give a polymer in the form of a rod. After shaping the rod into contact lenses by cutting and polishing in a usual manner, the lenses were immersed in a 50% aqueous solution of formic acid for 30 minutes and in 6 N hydrochloric acid for 2 hours. The acid-treated lenses were then immersed in a 0.024% aqueous solution of sodium carbonate to neutralize the acid in the lenses, and were further immersed and boiled in a 0.9% physiological saline water for 3 hours. This boiling treatment was conducted twice. The thus obtained water-absorptive contact lenses had a water content of 89.6%, an oxygen permeability of $4.50 \times 10^{-10}$ ml.cm./cm.$^2$sec.mmHg, a refractive index ($n_D^{20}$) of 1.350 and a visible ray percent transmission of more than 90%.

EXAMPLES 14 AND 15

Water-absorptive contact lenses were prepared in the same manner as in Example 13 except that the respective components in the polymerization were employed in amounts shown in Table 4.

The results are shown in Table 4.

TABLE 4

|  | Example 14 | Example 15 |
|---|---|---|
| Components (g.) | | |
| 1-MDIGLu | 41.7 | 62.0 |
| MMA | 20.8 | 31.0 |
| 2-HEMA | 21.9 | 4.7 |
| AMA | 0.2 | 0.2 |
| EG | 15.6 | 2.3 |
| ADMVN | 0.05 | 0.03 |
| Physical property | | |
| Refractive index ($n_D^{20}$) | 1.352 | 1.352 |
| Water content (%) | 87.5 | 87.9 |
| Oxygen permeability (ml. cm./cm.$^2$ sec. mmHg) | $3.98 \times 10^{-10}$ | $4.00 \times 10^{-10}$ |
| Visible ray percent transmission (%) | >90 | >90 |

EXAMPLE 16

In a monomer mixture of 95 g. of 3-MDIGLu, 5.0 g. of lauryl methacrylate, 0.5 g. of allyl methacrylate and 0.2 g. of ethylene glycol and dimethacrylate was dissolved 0.1 g. of azobisdimethylvaleronitrile, and the mixture was placed in a test tube. The polymerization was carried out stepwise at 35° C. for 48 hours, at 50° C. for 16 hours, at 70° C. for 4 hours, at 90° C. for 4 hours and at 110° C. for 4 hours to give a polymer in the form of a rod. After forming the rod into contact lenses by cutting and polishing in a usual manner, the lenses were immersed in a 50% aqueous solution of formic acid for 6 hours and in 6 N hydrochloric acid for 20 hours to convert isopropylidene groups into hydroxyl groups. The acid-treated lenses were then immersed in a 0.024% aqueous solution of sodium carbonate to conduct the neutralization treatment. The obtained water-absorptive contact lenses had a water content of 76.8%, an oxygen permeability of $3.83 \times 10^{-10}$ ml.cm./cm.$^2$sec.mmHg, a refractive index ($n_D^{20}$) of 1.369 and a visible ray percent transmission of more than 90%.

EXAMPLE 17

Water-absorptive contact lenses were prepared in the same manner as in Example 16 except that there was employed a monomer mixture of 92. g. of 3-MDIGLu, 3 g. of lauryl methacrylate, 5 g. of methyl methacrylate, 0.5 g. of allyl methacrylate and 0.2 g. of ethylene glycol dimethacrylate. The lenses had a water content of 74.8%, an oxygen permeability of $3.79 \times 10^{-10}$ ml.cm./cm.$^2$sec.mmHg, a refractive index ($n_D^{20}$) of 1.370 and a visible ray percent transmission of more than 90%.

The contact lenses obtained in Example 9 were continuously worn on the right eyes of 3 albino rabbits for 21 days. No change was observed on the corneal surfaces and also no decrease of glycogen was observed. Further, in respect of the histological observation, there was no vascularization, substantial edema and infiltration of inflammatory cells, and no morphologically significant change was observed between the right eye and the comparative left eye.

In addition to the components used in the Examples, other components can be used in the Examples as set forth in the specification to obtain substantially the same results.

What we claim is:

1. A water-absorptive contact lens made of a copolymer comprising acrylate or methacrylate units having saccharides as side chains and units of at least one member selected from the group consisting of a hydrophilic monomer and a hydrophobic monomer.

2. The contact lens of claim 1, wherein said saccharides are at least one member selected from the group consisting of D-galactose, D-glucose and D-mannose.

3. The contact lens of claim 1, wherein said hydrophilic monomer is at least one member selected from the group consisting of 2-hydroxyethyl methacrylate, 2-hydroxyethyl acrylate, 2-hydroxypropyl methacrylate, 2-hydroxypropyl acrylate, polyethylene glycol monomethacrylate, polyethylene glycol monoacrylate, acrylamide, methacrylamide, dimethylacrylamide, dimethylmethacrylamide, acrylic acid, methacrylic acid and N-vinyl pyrrolidone.

4. The contact lens of claim 1, wherein said hydrophobic monomer is at least one member selected from the group consisting of alkyl esters of methacrylic acid and acrylic acid wherein the alkyl group has 1 to 15 carbon atoms, styrene, vinyl acetate and vinyl propionate.

5. A process for preparing a water-absorptive contact lens which comprises the steps of carrying out a polymerization of a monomer mixture containing an ester of acrylic or methacrylic acid with a ketalized saccharide and at least one member selected from the group consisting of a hydrophilic monomer and a hydrophobic monomer, forming the obtained copolymer into a contact lens, treating the contact lens with an acid, and replacing the acid impregnated in the resulting water-absorptive contact lens with water or a physiological saline water.

6. The process of claim 5, wherein the polymerization is carried out in the presence of a wetting agent.

* * * * *